United States Patent [19]

Lindbauer et al.

[11] Patent Number: 5,096,680

[45] Date of Patent: * Mar. 17, 1992

[54] METHOD FOR WASTE GAS TREATMENT

[75] Inventors: Ralf Lindbauer, Statteggerstr; Franz Mair, Gartenstr, both of Austria

[73] Assignee: Waagner-Biro Aktiengesellschaft, Austria

[*] Notice: The portion of the term of this patent subsequent to Aug. 30, 2005 has been disclaimed.

[21] Appl. No.: 226,272

[22] Filed: Jul. 29, 1988

[30] Foreign Application Priority Data

Jul. 29, 1987 [AT] Austria .................................. 1926/87
Feb. 1, 1988 [AT] Austria .................................. 196/88

[51] Int. Cl.$^5$ .......................... B01J 8/00; C01B 7/00; C01B 17/00; C01B 21/00
[52] U.S. Cl. ..................................... 423/239; 423/235; 423/240 R; 423/244; 423/245.1; 423/247
[58] Field of Search .................. 423/235, 235 D, 239, 423/239 A, 244 A, 245.1, 247, 280 R, 240 S, 244 R

[56] References Cited

U.S. PATENT DOCUMENTS

| | | | |
|---|---|---|---|
| 3,505,008 | 4/1970 | Frevel et al. | 423/244 |
| 3,589,863 | 6/1971 | Frevel et al. | 423/244 |
| 4,105,744 | 8/1978 | Erdoess et al. | 423/240 |
| 4,767,605 | 8/1988 | Lindbauer | 423/239 |
| 4,839,147 | 6/1989 | Lindbauer et al. | 423/239 |

Primary Examiner—Gregory A. Heller
Attorney, Agent, or Firm—Steinberg & Raskin

[57] ABSTRACT

In a sorption bed which is formed as a fluidized bed reactor possibly with circulating fluid, or as a fixed-bed reactor, for dry waste gas or waste air, purification sorbents introduced in the dry state are contacted at a temperature range between about 30 and 130° C. by the waste gas with an at least 2% oxygen content and the acidic and/or oxidizable noxious gaseous components of the waste gas are found by the sorbent. Noxious gaseous components potentially include $SO_x$, HCl, HF, $NO_x$, Co and also hydrocarbons. The average dwelling time of the sorbents is at least about 20 minutes, in general several hours or days, and the average grain size of sorbent is at most 125 microns. The sorbent is introduced fresh and in stoichiometric ratio, with spent sorbent being correspondingly removed. Sorbents which may be considered are primarily baking soda (sodium bicarbonate), $Ca(OH)_2$ and $Mg(OH)_2$. Chlorides, fluorides, sulfate/sulfite mixtures, and nitrate/nitrite mixtures or mixtures of all of these compounds, occur in spent or used up sorbents. In particular, the reaction product that is carbonized in a low-temperature sorption stage, is reactivated through decarbonization by being returned to a combustion chamber of the combustion process, so that it can be used in a preliminary stage, primarily for removal of sulfur, chlorine, or fluorine. Due to the low temperature characteristics, the method herein can also be used for waste air purification, in particular for purifying tunnel waste air with carbon monoxide and hydrocarbons being oxidized. The spent or used-up sorbent is carbonized in the process, so that in this case, it can still be used completely (100%) for high temperature purification of the combustion chamber gases in a combustion chamber.

22 Claims, 1 Drawing Sheet

METHOD FOR WASTE GAS TREATMENT

BACKGROUND OF THE INVENTION

The present invention relates to a method for purification of waste gas or outgoing air with dry, powdery or granular sorbent at less than about 500° C. in a low temperature stage, in which acidic and/or oxidizable noxious gaseous components such as, for example, $SO_x$, HCl, HF, $NO_x$, CO, and $C_nH_m$ are bound to the sorbent giving off oxidizing radicals, in particular OH*. The waste gas is at least partially freed of flue dust before entering the low temperature stage and contains at least two percent (by volume) oxygen. The present invention is also directed to an arrangement for carrying out this type of method.

It has been known to remove noxious gaseous components from waste gases with sorbent, the essential requirement being that the sorbents are blown into the waste gas in superstoichiometric ratio, with disposal of the used, relatively uncharged (unloaded), but yet unusable sorbent. The consequences are relatively large disposals which give rise to attendant difficulties.

SUMMARY OF THE INVENTION

Accordingly, it is an object of the present invention to provide for better utilization of the sorbent, and hence for reduction of required disposal space. In the investigations carried out in the development of the present invention, it has been found that until now, the short term effect of the sorbent has always been taken into consideration. However, over the long term the sorbent in the waste gas stream shows a very different chemical response by activating and giving off radicals so that, even in a low temperature range, oxidation of the noxious gaseous components, with sulfate or nitrate formation, takes place in the presence of small amounts of oxygen in the waste gas and in the presence of several different noxious gaseous components in the waste gas, with even a conversion of CO into $CO_2$ or degredations of hydrocarbons taking place, and with the sorbent being already exhausted to a great extent in a single stage.

A limiting effect results from the carbonization of the sorbent, since $CO_2$ is also bound which, by and large, is not referred to as a noxious gaseous component. To comply with the above-noted objective, the present invention also deals with decarbonization of the sorbent which, in the final analysis, leads to pre-trapping of acidic noxious fractions, thus trapping $SO_x$, HCl, and HF in the combustion chamber so that the final stage can be relieved or the over all degree of trapping can be correspondingly increased.

The method according to the present invention thus permits dry sorption of the noted noxious gas components, in particular $NO_x$ which is the most difficult to remove, except for relatively small quantities of $NO_x$ such as are indicated in the accompanying table, which quantities are far below currently valid regulatory limits.

Accordingly, it is an object of the present invention to improve purification of waste gas, notably removal of noxious gaseous components from the waste gas.

It is also an object of the present invention to more efficiently treat waste gas with dry sorbent downstream of a combustion chamber.

It is an additional object of the present invention to improve the versatility in removing different kinds of noxious gaseous components from the waste gas.

These and other objects are attained by the present invention which is directed to a method for purifying waste gas, comprising the steps of introducing powdered or granular sorbent in dry form into the waste gas in a low temperature stage of less than about 500° C., whereby the sorbent decomposes to release free radicals including OH⁻ which bind acidic or oxidizable components present in the waste gas including at least one of $SO_x$, HCl, HF, $NO_x$, CO, and CnHm, at least partially freeing the waste gas of flue dust before passing the waste gas to the low-temperature stage, with the waste gas containing at least 2% by volume of oxygen at the low temperature stage, and exposing the waste gas to a multiple superstoichiometric ratio of the sorbent over a long dwelling time by adding sorbent to a sorption bed in a nearly stoichiometric ratio to the waste gas and at least intermittently removing spent sorbent from the sorption bed, with the sorption bed having a minimum layer thickness of about 0.5 mm and a maximum average grain size of sorbent of about 125 microns.

In particular, the sorption bed may be a flat or surface filter. The sorbent, which may be recirculated or fresh sorbent is introduced into the waste gas at a temperature of about 30° to 40° C. The sorption bed has an average layer thickness of about 2 to 20 mm. The sorbent is preferably contacted with the waste gas at a temperature of about 85° to 115° C. (of the waste gas).

The present invention is also directed to apparatus for purifying waste gas, which comprises a reactor containing sorbent and arranged in a waste gas duct between a combustion chamber and a stack, means for maintaining temperature of the waste gas in the range of about 30° to 130° C. at the position of the reactor, means for supplying fresh sorbent to the reactor, means for removing at least partially spent sorbent from the reactor, a return duct communicating with said removing means and with the combustion chamber for passing the at least partially spent sorbent to the combustion chamber, wherein this sorbent is partially reactivated and charged with noxious gaseous components, and a trap arranged in the waste gas duct for sorbent that is at least partially charged with noxious gaseous components.

The reactor is preferably positioned in the duct upstream of a suction ventilator and comprises a fixed sorption bed having a mean layer thickness of sorbent of about 2 to 20 mm, with the supply means comprising a filter connected to the reactor and through which fresh sorbent is supplied. Two traps may be situated in the duct, one upstream of the reactor and one downstream of the reactor.

The present method according to the invention is characterized in that fresh and/or recirculated sorbent is added in nearly stoichiometric ratios to the noxious gases in the sorption bed, in particular a flat or surface filter situated or spread in the waste gas stream, at a temperature of about 30° to 400° C., preferably about 85° to 115° C. Thus, the waste gas stream is offered sorbent over a long average dwelling time in multiple superstoichiometric ratios, while used up or spent sorbent is at least periodically drawn off. The sorption bed has a minimum layer thickness of about 0.5 mm and a maximum average grain size of the utilized sorbent of 125 microns.

The apparatus or arrangement according to the present invention for carrying out the method, in particular for achieving the additional objectives, is characterized in that a reactor, especially a sorption bed containing sorbent is arranged between a combustion chamber and a stack of a waste gas duct, in particular in front of a suction ventilator, and at a temperature range between about 30° and 130° C. The sorbent has a mean layer thickness of about 2 to 20 mm, and with fresh sorbent being added to the sorption bed, preferably through a filter connected thereto. Partially used up sorbent is removed from the sorption bed, and passed along a return duct into a combustion chamber in which the sorbent is partially reactivated and additionally charged with noxious gaseous components. This cycled sorbent is passed along a reaction path in the waste gas duct and then into a trap, in particular before reaching the reactor again. In other words, the trap is situated in the waste gas duct a suitable distance down stream from the combustion chamber for allowing the sorbent to be reacted or charged with the noxious gaseous components, and is preferably situated upstream of the reactor in the waste gas duct, for trapping the sorbent partially charged with the noxious gaseous components.

Thus, the present invention is directed to a method for waste gas purification with powdered or granular sorbents introduced dry at less than about 500° C. in a low-temperature stage, in which acidic and/or oxidizable noxious gaseous components such as, for example, $SO_x$, HCl, HF, $NO_x$, CO, $C_n H_m$ are bound by the sorbent giving off oxidizing radicals, in particular OH*, with the waste gas having been at least partially freed of flue dust before entering the low temperature stage and containing at least 2% oxygen by volume. Fresh and/or recirculated sorbent is added in nearly stoichiometric ratio to the noxious gases into a sorption bed situated or spread in a waste gas stream at about 30° to 400° C., which is in particular a surface or flat filter. Thus, sorbent in multiple super stoichiometric ratio over a long average dwelling time is offered into the waste gas stream, while used up sorbent is carried off, at least periodically. The sorption bed has a minimum layer thickness of about 0.5 mm, especially an average layer thickness about of 2 to 20 mm and an average grain size of utilized sorbent up to about 125 microns maximum.

The ratio kg. waste gas/h to kg sorbent in the sorption bed is less than or equal to about 500 $h^{-1}$, while the average dwelling time of the sorbent in the sorption bed is at least about 20 minutes and the average dwelling time of the gas at a relative humidity of less than or equal to about 99.9% in the sorption bed, is at least about 0.1 seconds.

The sorbent utilized in the low temperature stage may include hydrogen carbonates, in particular $KHCO_3$, $NH_4HCO_3$, $NaHCO_3$ and/or Mg $(HCO_3)_2$, or a mixture of hydrogen carbonates and aluminum oxides having a grain size smaller than about 10 microns, such as $Al_2O_3$, AlOOH, or a mixture of the hydrogen carbonates with substitutes such as bauxite, silica gel, boric acid, simple organic acids such as, for example, formic acid, acetic acid and/or tartaric acid, and/or the heat-degradable alkali and alkaline earth salts thereof. The mixing ratio of the hydrogen carbonates with the aluminum oxides is selected as a function of the mixing ratio of the harmful substances. In particular, at an $SO_2/NO_x$ ratio of less than about 1.5, the ratio of bauxite/baking soda is selected to be less than or equal to about 1.

When using $NaHCO_3$ as the principal component of the sorbent at an average grain size between about 65 and 20 microns, the ratio kg. waste gas to kg. sorbent in the sorption bed is less than about 100 $h^{-1}$, especially less than about 10 $h^{-1}$, while at a smaller average grain size of less than about 20 microns, the ratio is less than about 250 $h^{-1}$, especially less than about 25 $h^{-1}$.

When using $Ca(OH)_2$ as the principal component of the sorbent, the ratio kg. waste gas/h to kg. sorbent in the sorption bed at a mean grain size of less than or equal to about 10 microns for the sorbent, is less than about 100 $h^{-1}$.

When using $Mg(OH)_2$ as the principal component of the sorbent, the ratio of kg. waste gas/h to kg. sorbent in the sorption bed at an average grain size of less than or equal to about 10 microns of the sorbent is less than about 150 $h^{-1}$, in particular less than about 15 $h^{-1}$.

On the high-temperature side or combustion chamber side of the reactor, and at temperatures above about 750° C., the noxious gas volume concentration ratio $SO_x$ to $NO_x$ is adjusted to be greater than about 1.5, preferably greater than about 2, especially by adding low-sulfer burnables or combustibles, and/or the absolute $NO_x$ content at the same site is set to be below about 1000 $mg/m^3$, preferably below about 400 $mg/m^3$.

The reaction products accumulating in the low-temperature stage, in which more than 85% of the trapped $SO_x$ of the waste gas can be demonstrated to be sulfate in a sulfate-sulfite mixture and more than 80% of the trapped $NO_x$ of the waste gas can be documented as nitrate in a nitrate/nitrite mixture, can be blown into the combustion chamber for pre-trapping acidic harmful substances, in particular chlorides, fluorides, and $SO_x$, in particular for the degradation of the carbonized fraction or setting of the $SO_x/NO_x$ ratio in the flowing waste gas.

The noxious gaseous volume concentration ratio may be controlled by primary measures known per se for decreasing $NO_x$ generation. For example, graded combustible introduction and/or flue gas recirculation can be utilized for decreasing the $NO_x$ concentration. Secondary measures known per se for decreasing the $NO_x$ which originated upon combustion can be applied, e.g. by blowing in N-compounds decomposing at temperatures above about 400° C. and known per se, such as, for example, carbamide, cyanuric acid, $NH_3$-containing or $NH_4$-containing compounds in aqueous or vapor-dissolved or dispersed form, especially by utilizing a catalyst.

Sorption agents utilized in the low-temperature stage may be partially previously blown into the combustion chamber as sorbents, and partially combusted and partially charged therein with harmful substances and then carried to the low-temperature sorption bed for reaction with remaining noxious gases.

The apparatus or arrangement for carrying out a method in accordance with the present invention, may be characterized by a reactor containing sorbent, especially a fixed sorption bed with a mean layer thickness of sorbent of about 2 to 20 mm, being situated between a combustion chamber and a stack of a waste gas duct, especially before a suction filter, and in a temperature range between about 30° and 130° C. Fresh adsorbent is supplied to the reactor, preferably through a filter connected thereto, with partially used up or spent sorbent being removed from the reactor and directed along a return duct into the combustion chamber in which this sorbent is partially reactivated and further charged with noxious gases. Then, after passing along a reaction path in the waste gas duct, the thus-charged and reacted sorbent is trapped in a trap, especially before reaching the reactor itself. In other words, a trap is arranged in the waste gas duct for the sorbent that is at least partially charged with noxious gases, preferably upstream of the reactor.

The reactor is preferably a stationary fluid bed or fluidized bed and comprises a reactor volume filled with sorbent that has a solid matter density of at least about 200 kg/m$^3$. The reactor itself may also be a fixed bed filter having a solid matter density in the reactor volume filled with the sorbent of at least about 300 kg/m$^3$, and preferably discontinuously or intermittently loosened up with loosening devices such as, for example, raking machinery or compressed air blasts for maintaining a maximum pressure drop of 0.02 to bar.

The sorption bed may be formed as a circulating fluidized bed in which the reaction volume filled by the sorbent has a solid matter density of at least about 10 kg/m$^3$.

BRIEF DESCRIPTION OF THE DRAWINGS

The present invention will now be described in greater detail below with reference to preferred embodiments illustrated in the accompanying FIGURES which represent schematic views of different embodiments of the method and apparatus of the present invention herein.

DESCRIPTION OF THE PREFERRED EMBODIMENTS

The embodiments illustrated in FIGS. 1-3 have been practically applied on a long-term basis with results of investigations being documented in the accompanying table below.

Figure 1:
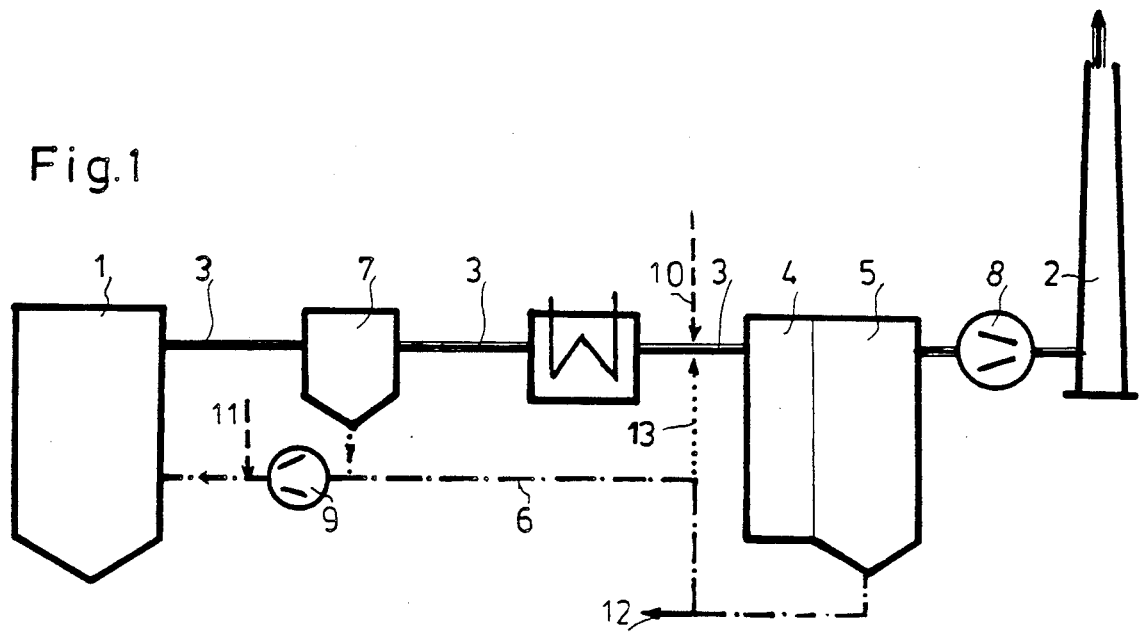

In FIG. 1, a circuit diagram of an installation according to the present invention is shown, with noxious gas-containing waste gas being generated in a combustion chamber 1 which, for example, is constructed as a boiler in a refuse incinerator installation. The waste gas may contain, inter alia, $SO_x$, HCl, HF, $NO_x$, non-combusted hydrocarbons and/or carbon monoxide. After cooling down, this waste gas is carried through a waste gas duct 3 and across a suction ventilator 8 to a stack 2. In the temperature range of the waste gas between about 30° and 130° C., a sorbent-containing reactor 4 is provided to which fresh sorbent is supplied either directly or by way of the waste gas to be purified, in a duct 10 in near stoichiometric ratio to the trapping effect to be achieved.

Figure 2:
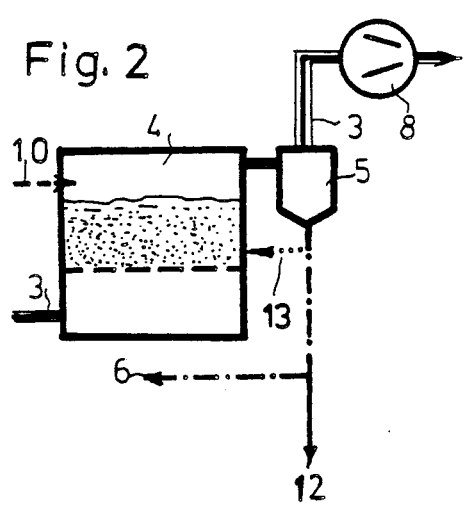

As shown in FIG. 2, the reactor 4 can be formed as a fluid bed reactor with a circulating fluidized bed, and with the trapping of the partially charged sorbent from the waste gas stream being carried out in a trap 5 before entering into the suction ventilator 8. In a fluid bed reactor with circulating fluidized bed, a part of the trapped sorbent is again carried in a duct 13 to the fluidized bed, while with a stationary fluidized bed the material carried out is considered to be used up and is again carried off in a duct 12 or supplied to a disposal site.

However, since the sorbent in the waste gas stream is also partially carbonized, the used up sorbent can be guided back through a duct 6 and a recirculation ventilator 9 into the combustion chamber 1 again, where the carbonized sorbent is decarbonized and made absorptive for chlorides, fluorides, and sulfites. This recharged sorbent is now removed from the waste gas stream together with the flue dust in a second trap 7, especially preceding the reactor 4 as illustrated.

Figure 3:
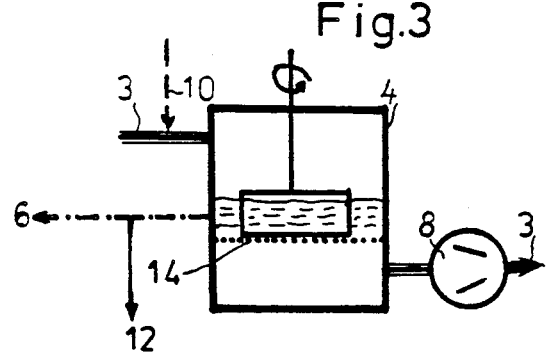

In FIG. 3, a further type of reactor is schematically shown, which can be called a fixed-bed reactor. In this type of reactor, the sorbent rests on a base or layer 14 and is urged by the waste gas stream towards this base 14. To avoid undesirable channel formations, the sorbent is at least periodically or intermittently stirred or recirculated or loosened by compressed air blasts.

The relatively large sorbent content of the reactor is a characteristic for the type of reactor which contains, for example, the hourly or daily requirement of sorption agent. The sorbent used up in each instance is carried off and fresh sorbent introduced in nearly stoichiometric ratio. This results in a relatively long dwelling time of the sorbent in the reactor so that the noxious gaseous fractions can diffuse into the interior of the grain. As a result of the fact that the sorbent gives off water due to the conversion, a certain inner reaction becomes possible which appears as oxidating radicals and favors the formation of chemically stable salts such as sulfates and nitrates.

As sorbent, a hydrogen carbonate such as, for example, $KHCO_3$, $NH_4HCO_3$, $NaHCO_3$ and/or $Mg(HCO_3)_2$ alone or as a mixture with aluminum oxide such as, for example $Al_2O_3$, AlOOH, or substitution constituents such as bauxite, silica gel, boric acid, simple organic acids such as, for example, formic acid, acetic acid and/or tartaric acid, and/or the heat-degradable alkali and alkaline earth salts thereof, can be used. The mixing ratio depends on the ratio of the noxious substances in the waste gas, in particular the $SO_2/NO_x$ ratio, with the ratio of bauxite to baking soda selected being greater than about 2 at an $SO_2/NO_x$ ratio of about 1.5, and less than or equal to about 1 at an $SO_2/NO_x$ ratio greater than about 3.

The grain sizes of the aluminum oxides should be smaller than about 10 microns and the specific area after BET greater than about 50 m$^2$/g, preferably greater than about 100 m$^2$/g, before being fed into the flue gas. Pre-activation takes place at the temperature range of about 300° to 700° C. and pore sizes of about 800 to 2000 Angstrom at BET about 100 m$^2$/g are achieved.

The reactions which take place can be approximately described as follows:

1. $Ca(OH)_2 \rightarrow Ca\,OH + OH^* \times NaHCO_3 \rightarrow NaHCO_3$
   $Na_2CO_3 + CO_2 + OH^*$ 2. However, the following reactions take place simultaneously in the presence of noxious gases and sufficient contact possibility:

$NO + OH^* \rightarrow HNO_2$ $NO_2 + OH^* \rightarrow HNO_3$ $SO_2 + 2OH^* \rightarrow H_2SO_4$ From (1) and (2) above, chemical fixation (chemisorption) at the alkaduct residue follows in the process:

$2HNO_3 + Na_2CO_3 \rightarrow 2\,NaNO_3 + H_2O + CO_2$ or $H_2SO_4 + CaO \rightarrow CaSO_4 + H_2O$ Dust analysis of the used up sorbents shows that most harmful substances are bound by sulfate formation or nitrate formation, and only a small part is present in a manner known per se as sulfites or nitrites. By giving off oxidized radicals such as OH*, the sorbent is primarily limited to hydrogen carbonates or hydroxides so that primarily baking soda, $Ca(OH)_2$, and $Mg(OH)_2$ or also other organic substances such as, for example carbamide with highly diverse additives or impurities and also in mixtures thereof with one another, can be used. The sorbent should be finely ground, and the upper grain size that is considered should be about 125 microns.

In the table below, experimental results are given using several sorbents having different grain sizes and also for different types of reactors. It is pointed out that the sorbents in each instance are used in the dry state. The ratio kg. waste gas/h to kg. of sorbent present in the reactor or sorbent bed was indicated as an important further characterizing value. It is evident that in the reactor, a daily or weekly supply of sorbent is present so that fluctuations in the noxious gas content that occur, for example, in a refuse incineration installation, can be handled by the purification installation according to the present invention without any problems, and the control of the freshly introduced sorbent can take place practically corresponding to the mean value. A further important characterizing feature is the low temperature at which sorption is carried out, which explains the long preservation of reactivity of the sorbents.

These adsorption or chemisorption measures also promote binding of heavy metals, for example in the form of metal chlorides and metal halogenides. It is also important that in the described methods, the noxious gases are oxidized to the most highly oxidized product (nitrate, sulfate) so that in the refuse very little nitrite and sulfite is found, NO or $NO_2$ are emitted below the visibility limit of 45 ppm, and nitrogen removal of 80% is possible to achieve.

The experiments carried out further indicate that non-combusted waste gas components such as, for example, CO and $C_nH_m$ are oxidized when passing through the reactor within the frame of the chemical and catalytic conversions, hence are not found in the stack at all or only in considerably smaller amounts.

Furthermore, experiments with the invention method have shown that the noxious substance ratio $SO_2/NO_x$ before entering the low temperature sorption stage should be greater than about 1.5, preferably greater than about 2, so that the final purification is especially effective. In order to achieve this, it is sensible to slow down $NO_x$ generation with primary measures known per se through graded addition of combustion material or flue gas circulation, or through secondary measures known per se to degrade the resulting $NO_x$ by blowing in N-compounds which decompose above about 750° C., such as, for example, carbamide, cyanuric acid, $NH_3$-containing compounds or $NH_4$-containing compounds in aqueous or vapor dissolved or dispersed form, especially by using a catalyst. The waste gases of the combustion chamber 1 are at least roughly purified of flue dust in a dry trap 7 and flow through the reactor 4 in which the treatment according to the invention for sorption of the noxious gases and concluding final purification take place. The sorption agent which is added in the dry state partially decomposes due to the relatively high temperatures splitting off water, $CO_2$ and/or $NH_3$ which facilitates the subsequent sorption of the harmful substances. To increase the absorption ability, the sorption agent is ground in mills before being blown in, so that the fracture surfaces are fresh and contain a given activation energy.

The mills can be arranged in the flue gas stream at temperatures of less than about 500° C. or can be directly penetrated by a partial stream of the flue gas, with the flue gas also functioning as transport medium. When air is used as transport medium, the air is introduced into the sorption through the grinding and by being blown therein. Furthermore, the excess air from the combustion in the steam generator can be utilized from approximately 4–6% to 9–15%, whereby the sulfate and nitrate formation is facilitated which, in turn, facilitates sorption.

As sorption agents for the ducts, hydrogen carbonates are used, with $NaHCO_3$ being the most economical. However, since the hydrogen carbonates also occur in nature, and/or potash can also accumulate as waste product more or less purely in chemical plants, the degree of economy of the individual hydrogen carbonates is not given a priori, so that even the most expensive (potash) is potentially the most economical. The hydrogen carbonate is blown in quantity sufficient for the $SO_x$ content and $NO_x$ content to be bound and with sulfur and nitrogen removal simultaneously taking place at this stage.

For this purpose, just shortly before the reactor 4, the hydrogen carbonate in stoichiometric quantity for separating $SO_x$ and $NO_x$ is blown in by way of the feeding site and this sorption agent rests on the surface or flat filter and forms a kind of filter cake through which the noxious gas must penetrate in order to reach the pure gas chamber which is directly connected to the stack. To increase the degree of trapping and also the decrease the stoichiometry, aluminum oxide in any form, such as, for example, bauxite or also another activatable sorption agent such as, for example, silica gel in approximately the same quantitative ratio as the hydrogen carbonate, which has catalytic effects and also has sorption properties due to its activation which bring about, in particular, the conversion of $NO_x$ to nitrates and nitrates as well as $SO_x$ into sulfites and sulfates, can be blown into the sorption agent. However, degradation of the $NO_x$ to nitrogen has also been observed. However, the adsorption is also partially addressed so that the harmful substances are directly bound into the crystal structure of the bauxite. Regarding this point, reference is made to equation number 9 below. The bauxite is first ground for the purpose of activation, and a mean grain size of less than about 10 microns should be achieved. Activation of the bauxite takes place at temperatures between about 300° and 700° C. and can possibly be provided in the flue gas channel of the gas stream to be purified, in a partial gas stream, or also in a trap from the flue gas. This increases the inner surface of the bauxite from approximately BET about 0.5 m²/g to at least BET about 100 m²/g, and pore sizes of approximately 800 to 2000 Angstrom are achieved.

This fully activated bauxite is marked

This fully activated bauxite or substitute is now collected and blown in as required, together with the hydrogen carbonate. The objective is, in any event, to fully activate bauxite as well as unreacted hydrogen carbonate to be present in the reactor which, when exposed to heat, changes into Na$_2$CO$_3$* after splitting off water.

The mixing ratio of the hydrogen carbonates with the bauxite depends upon the SO$_x$/NO$_x$ ratio in the gas stream. At an SO$_x$/NO$_x$ ratio of less than about 1.5, the ratio of bauxite/hydrogen carbonate (baking soda) is greater than about 2. At an SO$_x$/NO$_x$ ratio greater than about 3, the baking soda fraction increases and the ratio becomes smaller or equal to about 1. If the SO$_x$/NO$_x$ ratio is smaller than 3, the surface or flat filter can be arranged in the gas stream at a temperature of about 280° to 120° C., thus at a particularly low temperature.

To further decrease the refuse material, it is possible to wash the Al$_2$O$_3$ at least partially out from purified dust and to use it once again. Simultaneously, it is also possible to change the sodium sulfate at least partially into baking soda again, with the sulfates and possibly also nitrates or nitrites being bound into other salts with metal ions having a greater activity than sodium. For thermal activation of the hydrogen carbonate and the bauxite, the following three equations below (1), (2), and (3) are pertinent:

(1)

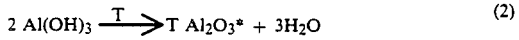

(2)

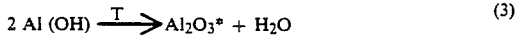

(3)

For the effect of the activated or fully activated substances, the following equations (4) to (9) are pertinent:

Na$_2$CO$_3$* + SO$_2$ + 1/2O$_2$ = Na$_2$SO$_4$ + CO$_2$  (4)

Na$_2$CO$_3$* + SO$_2$ = Na$_2$SO$_3$ + CO$_2$  (5)

Na$_2$CO$_3$* + SO$_2$ + NO + O$_2$ = Na$_2$SO$_4$ + CO$_2$ + NO$_2$  (6)

Na$_2$CO$_3$* + SO$_2$ + NO + 2NaHCO$_3$ + 2O$_2$ =
NaSO$_4$ + 2NaNO$_3$ + 3CO$_2$ + H$_2$O  (7)

Na$_2$CO$_3$* + SO$_2$ + NO + NO$_2$ + 2NaHCO$_3$ + O$_2$ =
Na$_2$SO$_4$ + NaNO$_3$ + NaNO$_2$ + 3CO$_2$ + H$_2$O  (8)

Al$_2$O$_3$* + SO$_2$ + NO + NO$_2$ = Al$_2$O$_3$
(SO$_2$ + NO + NO$_2$) + *ads*  (9)

In evaluating the known methods and the experiments, natural dependencies of the SO$_x$ and NO$_x$ content become evident during trapping and the NO$_x$ degradation is connected to the sulfate or sulfite content. It was therefore recognized as important to counteract the NO$_x$ re-formation and to reduce in an upstream stage the free sulfite content the waste gas before the NO$_x$ trapping, by blowing in lime, for example, so that sulfite is available to a decreased extent for the NO$_x$ apart from the unused sorption agent, and a trappable nitrate or nitrite forms, while a part of the NO$_x$ decomposes through sulfate formation or nitrate formation without binding the sorption agent. It has been shown in these experimental series that activated bauxite favors the conversion so that, in the final analysis, greater degrees of trapping can be achieved even under sub-stoichiometric conditions.

EXAMPLE 1

The flue gas of an incineration installation contains, upstream the dry trap, 20 g/Nm$^3$ dust, 15 mg HCl/Nm$^3$, 45 mg HF/Nm$^3$, 2300 mg SO$_2$/Nm$^3$, 600 mg NO$_x$/Nm$^3$.

The dust is reduced in the dust trap to approximately 1 g/Nm$^3$. By adding NaHCO$_3$ which is ground in the mill to an average of 13 microns far ahead of the flat or surface filter 1, after a contact time of 1.5 seconds at a stoichiometry of 1.3 calculated on the basis of the SO$_2$ content, a reduction of the noxious gases to 5 mg HCl/Nm$^3$, 0.5 mg HF/Nm$^3$, 700 mg SO$_2$/Nm$^3$, 500 mg NO$_x$/Nm$^3$ occurs. If only NaHCO$_3$ is added at a stoichiometry of 1.4 through the duct, a purified gas content results of 1.5 mg. HCl/Nm$^3$, 0.1 mg. HF/Nm$^3$, 260 mg. SO$_2$/Nm$^3$, 240 mg. NO$_x$/Nm$^3$ with the stoichiometry having been calculated for the SO$_2$ and NO$_x$ content. However, if fully-activated bauxite is added simultaneously with the NaHCO$_3$ approximately at a ratio of 1:1, then the noxious gas fraction in the purified gas, thus in the stack, decreases to the composition 1.0 mg. HCl/Nm$^3$, 0.1 mg. HF/Nm$^3$ 100 mg. SO$_2$/Nm$^3$, 110 mg. NO$_x$/Nm$^3$.

EXAMPLE 2

In a steam generator fired with lignite, a waste gas originates with an SO$_x$/NO$_x$ ratio of 1.5 and an NO$_x$ content of 800 mg./m$^3$ waste gas, which must be purified. Through the dry chemisorption alone, the NO$_x$ can only be insufficiently decreased by 50% to 400 mg/m$^3$. SO$_x$ trapping does not present any problems. However, if NO$_x$ is degraded before the chemisorption, for example through low NH$_3$ additions (NH$_3$/NO$_x$ ratio 0.7) then an insignificant NH$_3$ slip page of less than 10 mg./m$^3$ originates and the NO$_x$ content in the stack falls to below 200 mg./m$^3$, since through the 30% NO$_x$ degredation in the first stage, the NO$_x$/SO$_x$ ratio before the sorption stage is improved to 2.1 and hence the degree of NO$_x$ trapping in the chemisorption is improved to 70% (800 − 800 × 0.3 − 560 × 0.7 = 168).

To control the SO$_x$/NO$_x$ ratio before the chemisorption, all known methods can be used and it is of secondary importance for maintaining high degrees of effectiveness. In general, degrees of effectiveness of less than 50% are sufficient so that, reserve still exist here.

For decreasing the NO$_x$ content, there are:

(a) primary measures which influence the construction of the combustion chamber, such as, for example, graded combustible material and decreasing of the combustion temperature, for example by suctioning back waste gas, as well as (b) secondary measures through addition of decomposing N-compounds such as, for example, carbamide, cyanuric acid, NH$_3$-containing or NH$_4$-containing compounds with or without catalysts, while the nitrogen removal can take place in the partial stream as well as also in the main stream.

The concluding NO$_x$ and SO$_x$ trapping takes place in a chemisorption section at below 160° C., in particular 130° C., preferably on a cloth or mud filter covered with sorption agent, with the layer thickness being at least about 0.5 mm. The sorption agent has a grain size of less than about 60 microns, with the mean grain size being smaller than about 20 microns. For this, thermal pretreatment of the sorption agent a temperatures higher than 130° C. is recommended, so that a surface of more than 3 m$^2$/g is obtained. Sorption agents to consider are primarily baking soda (hydrogen carbonate), possibly in mixtures with bauxite or Ca(OH)$_2$ which absorb SO$_2$, and by changing the charged states also degrade or bind NO$_x$, with sulfate and nitrate formation also having been observed.

In regulating the addition to the sorption agent, in particular view of cleaning or precoating of the surface or flat filter, it has proven to be favorable that hydrogen carbonates are intermittently or discontinuously added at the end of the flue gas channel 3 before the flat or surface filter 1.

Within the framework of the present invention, it is possible to dispense with the dry purifier 7, and with the pre-trapping in the individual boiler parts being satisfactory whereby the raw dust content in the raw gas is only caught in flat or surface filters 1, and the raw dust trapped there loses its reusability. Moreover, instead of sodium hydrogen carbonate noted in the example, amodium hydrogen carbonate (sal volatile) can be used which decomposes even more readily than baking soda.

If the original ratio of SO$_x$:NO$_x$ is greater than about 4.5, it is advantageous to undertake in the combustion chamber SO$_x$ pretrapping by blowing in lime or amonium carbonate, whereby nitrogen removal can be displaced into the lower temperature zone and a ratio of SO$_x$:NO$_x$ of approximately 1:1 to 1:3 is achieved at the beginning of the final trapping. In order to achieve uniform dispersion or distribution of the sorption agent over the flue gas cross-section, a venturi-like structure the flue gas channel in place of the inlet is suggested, and the inlet duct for the sorption agent is in the entrance region of the venturi-pipe carried to the stream center and there obliquely cut off, so that the flowing flue gas pulls the sorption agent into the ventury channel. Instead of the obliquely cut inlet duct, a 90° deflection in the direction towards the venturi channel can also be provided.

An important part of the invention is that the gas stream to be purified penetrates a filter cake in which still-active or activated sorbent is contained. Therefore, when cleaning and even more so when applying the fresh sorbent substance, special care is required. For this purpose, it is advantageous to provide several flat or surface filters connected in parallel, of which one is switched off for cleaning a new charging or coating, without introducing additional impulses into the gas stream. An additional advantage is that the smaller cross-section of flow can more readily be provided uniformly with the sorbent, than extremely large cross-sections, so that the tandem operation of two filters can be improved through, for example, five parallel filters of which, in each instance, one is being cleaned off.

The preceding description of the present invention is merely exemplary, and is not intended to limit the scope thereof in any way.

Experimental Results

| Material | Grain size um | Solid density kg/m$^3$ | Pressure loss mbar | Layer thickness mm | Ratio kg waste gas/h: kg sorbent; h$^{-1}$ | °C. | (Min) degree of trapping SO$_x$ % | (Min) degree of trapping NO$_x$ % | Max. NO$_2$ content stack entrance ppm |
|---|---|---|---|---|---|---|---|---|---|
| 1. Fixed-bed | | | | | | | | | |
| NaHCO$_3$ fine | 15 | 540 | 25 | 23 | 4.9 | 92 | 80 | 80 | 45 |
| NaHCO$_3$ fine | 15 | 540 | 40 | 31 | 3.0 | 95 | 90 | 85 | 35 |
| NaHCO$_3$ coarse | 100 | 1270 | 20 | 29 | 1.5 | 104 | 85 | 75 | 60 |
| NaHCO$_3$ coarse | 100 | 1270 | 12 | 10 | 4.2 | 96 | 65 | 50 | 90 |
| Ca(OH)$_2$ | 5 | 470 | 60 | 26 | 4.3 | 108 | 60 | 50 | 20 |
| per 50% NaHCO$_3$ fine Ca(OH)$_2$ | 15-5 | 505 | 55 | 30 | 4.0 | 103 | 85 | 80 | 40 |
| Mg(OH)$_2$ | 10 | 310 | 50 | 22 | 4.1 | 88 | 65 | 60 | 20 |
| 2. stationary fluidized bed | | | | | | | | | |
| NaHCO$_3$ | 100 | 890 | 7 | 45 | 1.5 | 99 | 90 | 80 | 30 |
| 3. circulating fluidized bed | | | | | | | | | |
| NaHCO$_3$ | 15 | 50 | 1.5 | 4200 | 2.2 | 94 | 90 | 85 | 40 |

What is claimed is:

1. Method for purifying waste gas including at least two of SO$_x$, HCl, HF, NO$_x$, CO and C$_n$H$_m$ as impurities, said impurities comprising at least SO$_x$ and NO$_x$, the steps of
   providing a reactor with a sorption bed having a minimum layer of thickness of about 0.5 mm,
   utilizing a sorbent comprising,
   (i) a hydrogen carbonate selected from KHCO$_3$, NH$_4$HCO$_3$, NaHCO$_3$, and Mg(HCO$_3$)$_2$;
   (ii) a mixture of hydrogen carbonate and at least one of aluminum oxide, bauxite, silica gel, boric acid, formic acid, acetic acid, tartaric acid and heat degradable alkali and alkaline earth salts thereof;
   (iii) a hydroxide selected from calcium hydroxide or magnesium hydroxide; or
   (iv) a mixture of any of (i), (ii) and (iii),
   providing said sorbent in granular or powdered form and with a maximum average grain size of about 125 microns,
   maintaining a ratio of waste gas/h to kg sorbent in the sorption bed at less than or equal to about 500 h$^{-1}$,
   at least partially freeing waste gas, which contains at least 2% by volume of oxygen, of flue dust,
   introducing the thus obtained at least partially flue dust free waste gas into said reactor at a low temperature stage of from about 30° C. to about 500° C., whereby said sorbent decomposes to release free radicals including OH— which simultaneously binds acidic and oxidizable components present in the waste gas including at least said SO$_x$ and NO$_x$ as well as any present HCl, HF, CO and C$_n$H$_m$, whereby said $SO_x$ and $NO_x$ are bound mainly as sulfates and nitrates, respectively, and exposing the waste gas to a multiple super stoichiometric ratio of the sorbent over a long dwelling time of said sorbent by adding said sorbent to the sorption bed in a nearly stoichiometric ratio to the waste gas and at least periodically removing spent sorbent from the sorption bed.

2. The method of claim 1, wherein the sorption bed is a surface filter, the sorbent which is fresh or recirculated sorbent is introduced into the waste gas at a temperature of about 30° to 400° C., and the sorption bed has an average layer thickness of about 2 to 20 mm.

3. The method of claim 1, wherein the sorbent is introduced into the waste gas at a temperature of about 85° to 115° C.

4. The method of claim 1, comprising the additional steps of maintaining the sorbent in the sorption bed for an average dwelling time of at least about 20 minutes, and maintaining dwelling time of the flowing waste gas in the sorption bed at least about 0.1 seconds at a relative humidity less than or equal to about 99.9%.

5. The method of claim 1, wherein $NaHCO_3$ is a main component of the sorbent having an average grain size between about 65 and 20 microns, and the ratio of waste gas/sorbent in the sorption bed is less than about 100 $h^{-1}$.

6. The method of claim 5, wherein the ratio is maintained at less than about 10 $h^{-1}$.

7. The method of claim 1, wherein $NaHCO_3$ is a main component of the sorbent having an average grain size of less than about 20 microns and the ratio of waste gas/sorbent in the sorption bed is less than about 250 $h^{-1}$.

8. The method of claim 7, wherein the ratio is less than about 25 $h^{-1}$.

9. The method of claim 1, wherein $Ca(OH)_2$ is a main component of the sorbent having an average grain size of less than or equal to about 10 microns, and the ratio of kg. waste gas/h to kg. sorbent in the sorption bed is less than about 100 $h^{-1}$.

10. The method of claim 1, wherein $Mg(OH)_2$ is a main component of the sorbent having an average grain size of less than or equal to about 10 microns, and the ratio of kg. waste gas/h to kg. sorbent in the sorption bed is less than about 150 $h^{-1}$.

11. The method of claim 10, wherein the ratio is less than about 15 $h^{-1}$.

12. The method of claim 1, wherein $SO_x/NO_x$ concentration by volume ratio of the waste gas in a high temperature or combustion chamber side of the sorption bed at a temperature above about 750° C. is adjusted to be greater than about 1.5, before the gas enters the low temperature stage.

13. The method of claim 12, wherein the $SO_x/NO_x$ ratio is adjusted to be greater than about 2.

14. The method of claim 12, wherein the $SO_x/NO_x$ ratio is adjusted by introducing combustibles of low sulfur content into the waste gas in the high temperature side.

15. The method of claim 1, comprising the additional step of setting absolute $NO_x$ content of the waste gas on a high temperature or combustion chamber side of the sorption bed and at a temperature of above about 750° C., to be less than about 1000 $mg/m^3$, before the gas enters the low temperature stage.

16. The method of claim 15, wherein the $NO_x$ content is set below about 400 $mg/m^3$.

17. The method of claim 15, wherein the $NO_x$ content is controlled by at least one of the steps of introduction of combustibles, recirculation of flue gas, and blowing of N-compounds decomposing at temperatures above about 400° C. into the waste gas, including at least one of carbamides, cyanuric acid, $NH_3$-containing compounds and $NH_4$-containing compounds in aqueous or vapor dissolved or dispersed form.

18. The method of claim 17, comprising the additional step of introducing a catalyst into the waste gas.

19. The method of claim 1, comprising the additional step of conducting spent sorbent from the low temperature stage into a combustion chamber for pre-trapping harmful acidic substances trapped in the sorbent including at least one of chlorides, fluorides, and $SO_x$, and thereby degrading a carbonized fraction in the waste gas or setting an $SO_x/NO_x$ ratio in the waste gas, the substances trapped in the sorbent in the low temperature stage being constituted by more than about 85% sulfate in a sulfate/sulfite mixture of trapped $SO_x$ and more than about 80% nitrate of a nitrate/nitrite mixture of trapped $NO_x$.

20. The method of claim 1, comprising the additional step of partially blowing sorption agents used as sorbent in the low-temperature stage, into the combustion chamber as sorbent, whereby the sorption agents are partially combusted and partially charged with impurities and are carried to the low-temperature stage for reaction with remaining impurities in the waster gas.

21. Method according to claim 1 wherein said sorbent bed is a fluidized bed.

22. Method according to claim 1 wherein powdered or granular sorbent in dry form is introduced into the sorbent reactor.

* * * * *